United States Patent
Voss (10) Patent No.: US 10,901,596 B2
(45) Date of Patent: Jan. 26, 2021

(54) SYSTEM AND METHOD FOR FOCUSING A MOVING IMAGE CAMERA

(71) Applicant: Arnold & Richter Cine Technik GmbH & Co. Betriebs KG, Munich (DE)

(72) Inventor: Hendrik Voss, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 52 days.

(21) Appl. No.: 16/267,561

(22) Filed: Feb. 5, 2019

(65) Prior Publication Data

US 2019/0250804 A1 Aug. 15, 2019

(30) Foreign Application Priority Data

Feb. 12, 2018 (DE) .................. 10 2018 103 092

(51) Int. Cl.
 *G06F 3/048* (2013.01)
 *G02B 7/28* (2006.01)
 (Continued)

(52) U.S. Cl.
 CPC ......... *G06F 3/04847* (2013.01); *G03B 13/36* (2013.01); *G06F 3/0488* (2013.01);
 (Continued)

(58) Field of Classification Search
 CPC .......... H04N 5/232; G06T 7/00; G01S 17/00; G06F 3/048; G06F 3/00; G02B 7/28; G03B 13/20
 See application file for complete search history.

(56) References Cited

U.S. PATENT DOCUMENTS 6,724,429 B2 4/2004 Shore et al.
6,765,618 B1 7/2004 Sato
(Continued)

FOREIGN PATENT DOCUMENTS

DE 101 50 171 A1 5/2002
DE 102008052472 A1 4/2010
(Continued)

OTHER PUBLICATIONS

Search Report dated Dec. 9, 2019 in connection with European Patent App. No. 19154156.4.
(Continued)

*Primary Examiner* — Hugo Molina
(74) *Attorney, Agent, or Firm* — Amster, Rothstein & Ebenstein LLP (57) ABSTRACT

A focus setting display unit for a moving image camera comprises a data input that is configured to receive a focus setting that represents an instantaneous focal distance of an objective of the moving image camera as well as to receive distance values that represent the distances of a plurality of scene points in the field of view of the objective from the moving image camera. The focus setting display unit further comprises a display device and an evaluation and control device that is configured to control the display device to display a graphical representation of the focus setting and a graphical representation of a frequency distribution of the distance values in a spatial relationship to one another that reflects the spatial relationship of the instantaneous focal distance of the objective to the distances of the plurality of scene points.

17 Claims, 5 Drawing Sheets

(51) Int. Cl.
- *G03B 13/20* (2006.01)
- *G06F 3/0484* (2013.01)
- *G06F 3/0488* (2013.01)
- *H04N 5/232* (2006.01)
- *G06F 3/0481* (2013.01)
- *G03B 13/36* (2006.01)

(52) U.S. Cl.
CPC ..... *G06F 3/04817* (2013.01); *H04N 5/23212* (2013.01); *H04N 5/23216* (2013.01); *H04N 5/23254* (2013.01); *H04N 5/23293* (2013.01); *G02B 7/28* (2013.01); *G03B 13/20* (2013.01)

(56) References Cited

U.S. PATENT DOCUMENTS

| | | | |
|---|---|---|---|
| 2002/0080259 A1 | 6/2002 | Izumi | |
| 2007/0165931 A1* | 7/2007 | Higaki | G06K 9/00201 382/128 |
| 2009/0245677 A1 | 10/2009 | Nattress | |
| 2010/0079579 A1* | 4/2010 | Kikuchi | H04N 13/128 348/43 |
| 2012/0019702 A1 | 1/2012 | Richter | |
| 2012/0281132 A1* | 11/2012 | Ogura | G06T 5/003 348/348 |
| 2013/0148855 A1* | 6/2013 | Yasugi | G06T 5/002 382/103 |
| 2013/0182137 A1 | 7/2013 | Voss | |
| 2014/0063278 A1 | 3/2014 | Voss et al. | |
| 2014/0192162 A1 | 7/2014 | Aoki et al. | |
| 2015/0057107 A1* | 2/2015 | Leech | A63B 71/0622 473/407 |
| 2015/0331487 A1* | 11/2015 | Roth | G06F 3/013 345/156 |
| 2015/0341542 A1 | 11/2015 | Preston | |
| 2018/0252894 A1* | 9/2018 | Tang-Jespersen | G03B 13/20 |

FOREIGN PATENT DOCUMENTS

| | | |
|---|---|---|
| DE | 202013101874 U1 | 5/2013 |
| EP | 2 947 510 A1 | 11/2015 |
| WO | 2012126868 A1 | 9/2012 |

OTHER PUBLICATIONS

German Search Report dated Feb. 12, 2018 in connection with German Application No. 10 2018 103 092.4.

Search Report dated Aug. 5, 2019 in connection with European Patent App. No. 19154156.4.

Fauer J, "Preston Light Ranger 2," Film and Digital Times, Jun. 2014, Cine Gear Edition, Issue 64, 4 pages.

* cited by examiner

SYSTEM AND METHOD FOR FOCUSING A MOVING IMAGE CAMERA

The present invention relates to a focus setting display unit for a moving image camera, to a focus setting system for a moving image camera, to a method of simplifying the focusing of a moving image camera, and to a method of focusing a moving image camera.

The focusing of an objective of the moving image camera typically does not take place fully automatically, in particular in a professional use of moving image cameras, for example as part of productions for the cinema screen, but rather at least largely manually for a precise control of the focal range of the recorded moving image. This is due to the fact that not all the distance planes of the scene present in the field of view of the objective and detected by means of the moving image camera should be imaged as sharp, but a distance zone imaged as sharp is rather emphasized with respect to an unsharp foreground and/or background to direct the attention of the viewer to a specific area or also as an artistic stylistic device.

To focus an objective, its surface does not have to be exactly in an object plane corresponding to the instantaneous focal distance of the objective since the content of a specific distance zone that comprises the object plane as well as zones in front of it and behind it is also imaged as sharp on a film or on an image sensor of the moving image camera. The extent of this distance zone called the focal range or also the depth of field along the optical axis in particular depends on the instantaneous f-number of the objective.

The narrower the focal range, the more precise the focusing, i.e. the adaptation of the focal distance of the objective to the distance of one or more objects of the respective scene to be imaged as sharp, has to take place to ensure that the objects are in the focal range of the objective during a shot. If the objects to be imaged as sharp change their distance from the moving image camera during the shot, the focal distance furthermore has to be precisely tracked, that is continuously adapted to the changing distance. In professional film productions, the work of focusing the objective is therefore as a rule not carried out by the cameraman himself, but rather by the first assistant camera, that is by a so-called focus puller specifically responsible for focusing.

It is helpful for a precise focusing if the person responsible for it has a possibility of checking the instantaneous focal setting, i.e. in particular the focal distance, but preferably also the focal range, with respect to the scene to be detected and the objects of the scene to be focused. This can e.g. take place using a scale that is printed on or next to a control knob actuated for the adjustment of the focal distance and at which the instantaneous focal distance can be read off or with reference to a display that displays the instantaneous focal distance as a numerical value. In addition, specific focal distances that are to be set during the course of a shoot can be tried out in advance and can be marked by markers that can be set at the control knob or display so that they can be used as references during the shoot. It is furthermore generally conceivable that the focus setting is checked on a monitor image of the running shot. Such a monitor image is, however, not always available to the person responsible for the focusing or does not have a resolution sufficient for a reliable check of the focus setting.

Focus setting aids are known that identify focused areas directly in the detected moving images during the rolling shot and mark them in a specific manner in a monitor image of the running shot. The actual monitor image is, however, thereby superposed, which may be unwanted. In addition, the identification of the focused areas and the presentation of the sharpness information in the monitor image are comparatively complex. Such an apparatus is furthermore not suitable to support the focusing when the monitor image is not available. Focus setting aids are also known that detect the distance of an object of the scene to be recorded that is the closest of the objects in the scene to the moving image camera and to display a corresponding distance value. Such a system is, however, insufficient for a complex scene that comprises a plurality of objects in many different distances from the moving image camera, in particular when the focusing should be adjusted between a plurality of objects.

It is an object of the invention to provide a focus setting display unit for a moving image camera, a focus setting system for a moving image camera, a method of simplifying the focusing of a moving image camera, and a method of focusing a moving image camera that provide a reliable, but simultaneously intuitive and comfortable aid in the focusing of a moving image camera.

The object is satisfied by a focus setting display unit for a moving image camera in accordance with claim 1, by a focus setting system for a moving image camera in accordance with claim 11, by a method of simplifying the focusing of a moving image camera in accordance with claim 13, and by a method of focusing a moving image camera in accordance with claim 14.

Advantageous embodiments of the invention result from the dependent claims, from the present description, and from the Figures.

In accordance with the invention, the focus setting display unit for a moving image camera has at least a data input, a display device, and an evaluation and control device.

The data input is configured to receive a focus setting that represents an instantaneous focal distance of an objective of the moving image camera. The focus setting received via the data input can here also comprise further information in addition to the instantaneous focal distance and can in particular also represent the instantaneous focal range of the objective. The focus setting is preferably read off from the objective directly or via the moving image camera, said objective being able to have a corresponding data input or a corresponding interface for this purpose. If the focus setting display unit not only has means for displaying the focus setting, but also for adjusting the focus setting, as will be described in the following, the received focus setting can generally also only be a desired value of the focus setting that is, for example, received by an operating element of the focus setting display unit via an internal data input.

The data input of the focus setting display unit is furthermore configured to receive distance values that represent the distances of a plurality of scene points in the field of view of the objective of the moving image camera. The scene points are in particular points on surfaces of objects of a scene to be recorded or instantaneously being recorded. These points are preferably arranged distributed in a regular manner over the field of view of the objective. For example, the points can be distributed in accordance with a defined pattern, in particular at regular angular distances, e.g. in the horizontal and vertical directions, between adjacent points with respect to the angle of view at which the scene points appear from the objective or from a distance sensor arranged in the vicinity of the objective. A common connector can be provided as the data input for the reception of the focus setting and for the reception of the distance values. In general, the data input can, however, also be divided and can comprise two or more different connectors.

The distances of the scene points from the moving image camera can generally be a distance radial to reference point of the moving image camera in the sense of the length of the straight-line distance between a respective scene point and this reference point. Said distances of the scene points from the moving image camera are, however, preferably to be understood as exclusively limited to the direction portion extending along the optical axis of the objective. The distance of a respective scene point from the moving image camera can to this extent be the distance of the scene point from a reference plane of the moving image camera or of the objective. This reference plane can in particular correspond to an image plane coinciding with the position of the film or of the image sensor of the moving image camera or to another characteristic plane of the objective, e.g. to the main plane of the objective.

The spatial direction defined perpendicular to this reference plane is typically called the depth. Since as a rule at least ideally an object plane perpendicular to this spatial direction is imaged as sharp by an objective, the focal distance of the objective is also to be understood with respect to this spatial direction. If a distance sensor that typically measures radial distances is used for the measurement of the distances of the scene points from the moving image camera, it may be necessary to first respectively convert the radial distances into the corresponding depth, for instance using additionally detected angle of view information, before corresponding distance values are output to the data input of the focus setting display unit.

Where reference is made to the focal distance of the objective in connection with the invention, this is in particular to be understood as a distance between the object plane and the image plane of the objective or as a distance value unambiguously correlated thereto.

The display device of the focus setting display unit in accordance with the invention can in particular comprise an electronic display surface having a two-dimensional matrix of pixels that can be individually controlled to reproduce differing kinds of image information overall on the display surface. The display surface is, for example, an LCD screen, TFT screen, OLED screen, or a screen based on a comparable technology. In this manner, in addition to letters and numbers, graphical representations of essentially any desired kind e.g. lines, curves, areas, and symbols can be displayed separately from one another or in superposition, in different spatial relationships to one another that can also vary.

The evaluation and control device is configured to control the display device to display a graphical representation of the focus setting and a graphical representation of a frequency distribution of the distance values in a spatial relationship to one another, the displayed graphical representation reflecting (i.e. corresponding to) the spatial relationship of the instantaneous focal distance of the objective to the distances of the plurality of scene points in the field of view of the camera objective. The spatial relationship is preferably such that an agreement or proximity of the focal distance of the objective with a specific distance value can be directly intuitively recognized with reference to said spatial relationship. This can be achieved, for example, in that, in the event of such an agreement, the graphical representation of the focal distance and the part or the point of the graphical representation of the frequency distribution corresponding to the distance value coincide on the display device. In this connection the term "frequency distribution" is to be understood as a distribution of occurrence of the distance values.

The instantaneous focal distance together with the instantaneous focal area of the objective of the moving image camera can be graphically shown as the graphical representation of the focus setting. Since the focal area always includes the focal distance, the focal area can be considered as representing the focal distance by its variation. To this extent, the display of the graphical representation of the focus setting can also only comprise the fact that the instantaneous focal area is shown graphically. For it may be sufficient for a support of the focusing if only either the instantaneous focal distance or the instantaneous focal area is shown graphically as the graphical representation.

The instantaneous focal distance can be graphically represented, for example, by a line, a symbol, or a marker. In general, the focal distance can also be displayed as a numerical value. The position of the respective graphical representation on the display unit, in particular on a display surface of the display unit, can depend on the value of the instantaneous focal distance so that it changes on an adjustment of the focal distance. The instantaneous focal area can, for example, be graphically represented as a line, a bar, or an area whose extent corresponds to the depth of the instantaneous focal area. Alternatively or additionally, also only the boundaries of the instantaneous focal area, i.e. its minimum and maximum depths, can be graphically shown. The position and the extent of the graphical representation of the instantaneous focal area can here vary in dependence on changes of the focal area. In general, the graphical representation of the instantaneous focal distance and/or of the instantaneous focal area can, however, also be of fixed position, with then changes of the instantaneous focal distance or of the instantaneous focal area being able to be reflected, for example, by the displacement of a scale relative to which the respective graphical representation is displayed.

If the instantaneous focal distance and the instantaneous focal area are shown together graphically, the graphical representation of the focal range is preferably arranged relative to the graphical representation of the focal distance in a manner by which the manner in which the instantaneous focal area surrounds the instantaneous focal distance is reflected. For this purpose, the focal area and the focal distance are, for example, shown entered over a common axis by which the respective depth with respect to the moving image camera is indicated, with this axis itself, however, not having to be graphically shown.

The graphical representation of the frequency distribution of the distance values of the plurality of scene points can, for example, be displayed in the form of one or more curves that are preferably likewise entered over an axis as the abscissa by which the respective depth is indicated with respect to the moving image camera, with this axis also not having to be graphically shown itself. The direction of the ordinate perpendicular to this axis then corresponds to the frequency of a respective distance value. The representation could thus correspond to that of a histogram.

If objects moves in the field of view of the objective with respect to their distance from the moving image camera, the frequency distribution of the distance value and thus also the graphical representation of this frequency distribution changes. If the number of scene points whose distance values are present is sufficiently large or if the distribution of the scene points over the field of view of the objective is sufficiently fine, such movements of objects can result in the migration of maxima of the frequency distribution. If the frequency distribution is shown as a curve, the positions of peaks of the curve are displaced in this process. Changes in the distance of individual objects from the moving image camera can be simply recognized in an intuitive manner using such changes of the graphical representation of the frequency distribution of the distance values.

Since said spatial relationship of the graphical representation of the focus setting and of the graphical representation of the frequency distribution of the distance values reflects the spatial ratio of the instantaneous focus distance of the objective to the distances of the plurality of scene points, the spatial relationship of the graphical representation on the display device also always changes when the focal distance or the distances change. In this manner, the person responsible for the focusing of the moving image camera, on the one hand, receives visual feedback on the adjustment of the focal distance and, on the other hand, respective current information on where (with respect to the depth), relative to the instantaneous focal distance, how many of the detected scene points are disposed. This makes possible a simple, in particular intuitive and comfortable, continuous adaptation of the focal distance to moving objects and an equally simple adjustment of the focal distance for a change of the object to be focused.

As a result of an adjustment of the focal distance, the spatial relationship of the graphical representation of the focus setting and of the graphical representation of the frequency distribution of the distance values changes. For this purpose, however, both graphical representations do not necessarily have to change their positions on the display device since the spatial relationship also changes when at least one of the two graphical representations is moved. Provision can therefore be made, for example, that one of the two graphical representations is generally of fixed position. The graphical representation of the focus setting itself can in particular remain unchanged even on an adjustment of the focal distance at least with respect to its position or also overall (optionally apart from a displayed numerical value of the instantaneous focal distance) if instead the graphical representation of the frequency distribution of the distance values changes with respect to its position such that the spatial relationship of the two graphical representations continues to reflect the spatial relationship of the (changed) focal distance of the objective to the distances of the plurality of scene points.

The focus setting display unit (or the focus setting display and control unit) can in particular be configured as a mobile, i.e. portable, hand-held unit. This hand-held unit can be adapted for a wired and/or for a radio-based connection to the moving image camera or to an accessory connected thereto.

In accordance with an advantageous embodiment the evaluation and control device is configured to control the display device to represent the focus setting and the frequency distribution entered over a common axis for the display of the graphical representation of the focus setting and of the graphical representation of the frequency distribution of the distance values. This common axis in particular indicates the depth with respect to the moving image camera, that is it corresponds to the distance from a reference plane of the moving image camera. If the focus setting, in particular the focal distance or the focal area, and the distances of the scene points from the moving image camera are defined relative to different reference planes, a conversion to a common zero point of the common axis can first be required. However, neither the zero point or a scale of the common axis nor the common axis itself have to be displayed since it can be sufficient for a simplified focusing if the person responsible for the focusing can visually perceive the spatial relationship of the graphical representation of the focus setting and of the graphical representation of the frequency distribution of the distance values without it being necessary also to be able to read off absolute values. The common axis can nevertheless optionally be indicated by a scale. Absolute values, e.g. of the instantaneous focal distance and/or of characteristic points of the frequency distribution can also additionally be displayed as numerical values.

The fact that a graphical representation is entered "over" an axis is here not to be understood as an indication of spatial direction in the sense of "above". It is rather only meant that a (common) reference for the scaling and position of the respective representation along the axis is specified by the (common) axis. A change of the spatial relationship of the graphical representation of the focus setting and of the graphical representation of the frequency distribution of the distance values thus in particular corresponds to a displacement of the graphical representations relative to one another in a direction in parallel with the common axis.

The common axis can be oriented horizontally, vertically, or in another manner on the display device. The common axis is preferably aligned such that it is arranged or can be arranged in parallel with an adjustment direction of an operating element for adjusting the focal distance. If the adjustment of the operating element takes place about an axis of rotation, the common axis is preferably arranged tangentially to a circle about the axis of rotation or, if the display device has a correspondingly curved display surface, in a peripheral direction about the axis of rotation.

The common axis furthermore does not have to be linear, but can, for example, also be scaled logarithmically, exponentially, or in another manner. In addition, the common axis can regionally, in particular in a region of interest, have a scaling increased with respect to surrounding zones. This makes it possible in particular also to display a particularly relevant portion of the graphical representations with improved resolution on small display device. The region of interest that is displayed with an increased scaling preferably changes dynamically in this respect, namely such that it surrounds, in particular symmetrically, the instantaneous focal distance and preferably also respectively completely encompasses the instantaneous focal area.

In accordance with an advantageous embodiment, the evaluation and control device is configured to determine the frequency distribution of the distance values as a uniform frequency distribution in that each distance zone of a series of consecutive distance zones has the number of all of the distance values falling in this distance zone associated with it as a frequency. In such an embodiment, the evaluation and control device is furthermore preferably configured to control the display device to enter the frequency associated with a respective distance zone above this distance zone for the display of the graphical representation of the frequency distribution.

The series of consecutive distance zones preferably extends over all the received distance values so that each distance value can be unambiguously associated with one of the distance zones. The distance zones preferably all have the same extent. The extent, however, does not have to be identical for all the distance zones, but can, for example, be the larger, the further the distance zone is remote from the moving image camera. This can, for example, be useful to take account of an accuracy of a distance sensor that decreases as the distance increases. In addition, the frequency distribution can also have a resolution that decreases as the distance from the moving image camera increases since as the focal distance increases, the focal range becomes larger and the focusing can therefore take place with a smaller accuracy.

The number of the distance values falling in a respective distance zone that is associated as a frequency with this distance value can be averaged or standardized by a factor. If the distance zones do not have any constant extent, this factor is preferably likewise not constant, but rather in particular inverse to the respective extent of the distance zone to compensate the influence of the extent of the distance zone on the respective frequency.

The determination of the frequency distribution can furthermore comprise the fact that subsequent to the association of the individual frequencies with the distance zones rounding or filtering processes still take place. This can serve to smooth the distribution or also to mask zones having very low frequencies that are, for example, below a defined threshold value and thus represent background noise, for instance in that the frequencies of such zones are set to zero.

In a generally similar manner, a frequency distribution specific to a field of view portion can also be determined instead of a uniform frequency distribution. Accordingly, the evaluation and control device is configured in accordance with a further advantageous embodiment to determine the frequency distribution of the distance values as a frequency distribution specific to the field of view portion in that the field of view of the objective is divided into portions and the number of those distance values falling in this distance zone is associated as a frequency with each combination of one of the portions with a distance zone of a number of consecutive distance zones, said distance values representing the distance of a scene point disposed in the respective portion from the moving image camera. This division of the field of view of the objective can in particular also comprise a division of the field of view of a distance sensor provided to measure the distances, with this field of view of the distance sensor preferably (at least substantially) corresponding to the field of view of the objective.

In such an embodiment, the evaluation and control device is accordingly furthermore preferably configured to control the display device to enter the frequency associated with the combination of this portion with a respective distance zone over this respective distance zone for the display of the graphical representation of the frequency distribution for each of the portions separately. The determination of a frequency distribution specific to a field of view portion here requires that the information as to the portion of the field of view of the objective in which the scene point is disposed whose distance from the moving image camera this distance value represents is also respectively detected and received together with each distance value.

The difference between the uniform frequency distribution and the frequency distribution specific to a field of view portion therefore substantially comprises the fact that the field of view of the objective is divided into a plurality of portions and that not all the distances that fall in a respective distance zone are pooled, but that the frequencies are rather specifically determined for each of the portions. The portions in which the point of view is divided can correspond to a predefined or predefinable pattern, with the field of view being divided into portions, for example, horizontally and/or vertically, preferably at regular angular intervals. In accordance with a preferred embodiment, the field of view is only divided in one direction, preferably along the horizontal. In this case, the portions thus correspond to vertical strips that are horizontally adjacent to one another. In this manner, a smaller complexity, also in particular in the graphical representation of the frequency distribution, is achieved with respect to a two-dimensional division. A separate curve can, for example, be displayed as a graphical representation for each portion of the field of view and indicates the frequency of the distance values of the scene points present in this portion with respect to the respective distance from the moving image camera. The different curves can here, for example, have different colors, patterns, or marks for a clearer distinction.

In accordance with an advantageous embodiment, the evaluation and control device of the focus setting display unit is configured to control the display device to display a graphical representation of the frequency distribution of the distance values that is restricted to a predefinable distance zone and/or to an adaptive distance zone. In other words, the frequency distribution is not necessarily shown completely, i.e. over the total zone in which distance values are present, but provision can rather be made that only a portion of the frequency distribution that corresponds to a certain distance zone is, at least selectively, shown. The portions of the frequency distribution that are disposed outside the respective distance zone, however, do not necessarily have to be completely masked, but can rather also only be displayed specifically marked, e.g. colored, superposed, or weakened.

Said distance zone can be predefinable by a user of the focus setting display unit. The predefinable distance zone can in particular respectively correspond to a restriction of the adjustability of the focal distance to a desired focal range. Such a restriction can preferably be substantially freely fixed by the person responsible for the focusing to preclude an adjustment of the focal distance beyond certain limits in advance in dependence on the scene to be recorded. If the focal distance is only adjustable within a restricted focal range, it can be sufficient to support the focus to only display the frequency distribution for those distance values that are disposed within this focal range, which can then be achieved by the predefinable distance zone being brought to coincide with the fixed focusing range. This preferably takes place automatically so that the distance zone for which the frequency distribution is displayed can also simultaneously be predefined in a corresponding manner by the setting of restrictions of the focal adjustment.

Alternatively or additionally, the focus setting display unit can provide the possibility of also selecting, instead of a distance zone predefinable directly or by fixing a restricted focusing range for the graphical representation of the frequency distribution, an adaptive distance zone that automatically adapts to changing circumstances, in particular to changes of the frequency distribution. In this manner, the displayed distance zone of the frequency distribution can advantageously respond to movements of objects of the detected scene. The adaptive distance zone here preferably corresponds to that zone of a peak of the frequency distribution, namely in particular that peak that of all peaks of the frequency distribution corresponds to the smallest distance from the moving image camera. Provision can alternatively be made that a user of the focus setting display unit can individually selected a peak of the frequency distribution and the adaptive distance zone then corresponds to the zone of this peak.

A peak of the frequency distribution here corresponds to a zone about an at least local maximum of the frequency distribution. The extent of this range can be defined in different manners, for example by a full width at half maximum or in that the peak extends as far as the values at both sides of the maximum decreases monotonously. The greater the surface is of an object arranged in the field of view of the objective at a certain distance or distance zone from the moving image camera, the more pronounced, i.e. wider and in particular higher, the corresponding peak in the frequency distribution is. Provision can furthermore be made here that only a zone that is defined by such a maximum and whose height exceeds a certain threshold value is considered as a peak for the determination of the adaptive distance zone to preclude, for instance, local maxima of background noise or maxima corresponding to particularly small objects of the scene.

The adaptive adaptation of the displayed distance zone of the frequency distribution to a peak of the frequency distribution enables an isolation of the distance information over an individual object of the scene. In this manner, the focusing of this one object is simplified since it cannot be confused with other objects. In addition, movements of the object toward or away from the moving image camera can be simply tracked using displacements of the peak in the frequency distribution and the focal distance can here be respectively adapted accordingly. The isolated peak of the frequency distribution can generally also be used for an automatic tracking of the focal distance to adapt to changes of the distance of the corresponding object from the moving image camera. If the focus setting display unit is configured to adjust the focal distance of the objective, a kind of automatic focus tracking of an object of the scene can be implemented in this manner.

In accordance with an advantageous embodiment, the evaluation and control device is configured to control the display device to display a graphical representation of the frequency distribution of the distance values that comprises a separate marking of maxima of the frequency distribution by means of graphical markers. A graphical marker can, for example, be an arrow or a triangle and can indicate the respective maximum. Different maxima can here be characterized by different markers that differ, for example, with respect to their shape and/or color.

On changes of the frequency distribution that are caused by movements of the objects of the scene, each marker is preferably continuously taken along with the corresponding maximum. If respective information on the position of the underlying scene point within the field of view of the objective is also present for the received distance values, two or more maxima can then also be tracked and specifically marked by different markers if they sway their positions in the frequency distribution and in so doing optionally superpose one another temporarily so that they form a single maximum. The marking of the maxima by graphical markers serves the visual emphasizing of the maxima and thus of individual objects of the scene that underlie the different maxima. In this manner, the focusing of a respective object and an adjustment of the focusing on a change of the object to be focused is simplified. In general, zones of the frequency distribution marked by a respective marker can also be masked here to simplify the representation and only the corresponding marker can be displayed in its place.

In accordance with a further advantageous embodiment, the focus setting display unit furthermore comprises a control signal output for outputting control signals to adjust the focal distance of the objective. The focus setting display unit can output control signals, in particular to the moving image camera, to its objective, or to a separate objective drive apparatus, via such a control signal output to adjust the focal distance of the objective by it. To this extent, such an embodiment of the focus setting display unit can also be called a focus setting display and control unit or simply a focus setting unit. The control signals for the adjustment of the focal distance can here, for example, be generated by the evaluation and control device of the focus setting display unit, in particular in dependence on inputs of a user and/or on changes of the frequency distribution of the distance values. Alternatively or additionally to the outputting of control signals for the adjustment of the focal distance of the objective, the control signal output can also be configured to output control signals to set a distance sensor that can be provided to measure the distances of the scene points from the moving image camera.

The focus setting display unit can furthermore comprise an operating element, wherein the evaluation and control device is configured to output control signals to adjust the focal distance of the objective at the control signal output in dependence on actuations of the operating element. Inputs of a user can in this case therefore take place by the actuation of the operating element. The operating element can in particular be a control knob. The graphical representations of the focus setting and the frequency distribution of the distance values on the display device are here preferably aligned such that an axis that indicates the distance from the moving image camera is arranged perpendicular to an axis of rotation of the control knob so that an adjustment of the focal distance by rotating the control knob has the result that the graphical representations are displaced relative to one another in the peripheral direction or tangentially to the axis of rotation.

The graphical representation of the frequency distribution is here preferably displaced, while the graphical representation of the focus setting is stationary. In this manner, the graphical representation of the focus setting can advantageously be centrally displayed on a display surface of the display device, while the change of the arrangement of the graphical representation of the frequency distribution as a consequence of an adjustment of the focal distance can be used to check the agreement of the focal distance or of the focal area with an object to be focused and to bring this about where necessary by actuating the operating element.

In accordance with an advantageous embodiment, the evaluation and control device is configured to output control signals to adjust the focal distance of the objective to the control signal output in dependence on changes of the frequency distribution. In other words, the evaluation and control device evaluates the frequency distribution and optionally its changes to automatically adapt the focal distance via the control signals output at the control signal output in response to such changes.

The output of control signals dependent on changes of the frequency distribution preferably takes place such that the focal distance of the objective is regulated in accordance with a desired value for the focal distance defined by a characteristic zone of the frequency distribution. In other words, the evaluation and control device is configured to first identify such a characteristic zone of the frequency distribution and to derive a desired value from this for the focal distance to be set, with said desired value then being decisive for a regulation of the focal distance. For example, the characteristic zone can be a peak of the frequency distribution and the distance value that corresponds to the maximum of the peak can then be set as the desired value. If the frequency distribution has a plurality of characteristic zones, provision can be made that a user can select a characteristic zone therefrom that is used for the determination of the desired value of the focal distance. Such a selection can take place particularly simply by touching the characteristic zone in the graphical representation of the frequency distribution on a touch-sensitive screen of the display device.

Additional information can be used to also be able to track an identified and/or selected characteristic zone of the frequency distribution when distance values on which different objects of the scene are based overlap at least temporarily and therefore no unambiguous association with individual ones of these objects is at least possible with a uniform frequency distribution. For example, the distance values can be received together with information on the position of the respective underlying scene point within the field of view of the objective if a distance sensor used to measure the distances is configured to measure in a specific direction. The distance values can, however, also be linked with additional positional information that is determined in a different manner and that is derived, for example, from the recorded image of the scene, for instance by means of methods of object recognition and/or facial recognition or tracking.

In accordance with a further advantageous embodiment, the display device comprises a touch-sensitive screen that is configured to display the graphical representation of the focus setting and the graphical representation of the frequency distribution of the distance values and to detect touch inputs. Alternatively or additionally, knobs, buttons, or similar can be provided in combination with a menu guidance displayed on the display device for the interaction between a user and the focus setting display unit. A touch-sensitive screen in contrast enables a particularly comfortable input with small space requirements. The touch inputs can, for example, as explained above, serve for the selection of a characteristic zone of the frequency distribution, for instance to automatically have the focal distance track this characteristic zone or the object of the scene underlying it. In addition, touch inputs can serve for the configuration of content displayed by the display device. For example, the scaling of the content can be increased or decreased in a vertical direction by swiping a finger up or down and in a horizontal direction by swiping a finger left or right; the scaling can be reset to a base setting by double tapping with a finger.

Instead of or in addition to a screen, the display device can also have an interface for connecting an external, preferably touch-sensitive, screen. This interface can be adapted for a wired and/or for a radio-based connection. In a similar manner, said data input and/or, if present, said control signal output of the focus setting display unit can also be adapted for a wired and/or for a radio-based connection.

The focus setting system for a moving image camera in accordance with the invention comprises a focus setting display unit in accordance with the invention that can be configured in accordance with at least one of the above-described embodiments and can additionally comprise a distance sensor for measuring the distances of the plurality of scene points from the moving image camera and for outputting distance values that represent the measured distances to the data input of the focus setting display unit. In general, the distance information could here also be derived from the image information, for instance from a stereoscopic image. In such a case, the distance sensor is not a separate apparatus, but rather a functional unit integrated in the moving image camera. The distance sensor is, however, preferably an apparatus separate from the moving image camera, albeit expediently attached to the moving image camera or at least configured for attachment to a moving image camera. The distance sensor can, for example, be based on measurement techniques such as RADAR, LIDAR, or TOF (time of flight).

If the display device of the focus setting display unit of the focus setting system comprises a touch-sensitive screen, the distance sensor can preferably be set by touch inputs on this screen. To this extent, the focus setting display unit can, for example, be configured to output control signals to the distance sensor in dependence on detected touch inputs to adjust the field of view of the distance sensor, in particular to adapt them to the instantaneous field of view of the objective of the moving image camera.

Such an adaptation of the field of view of the distance sensor preferably takes place automatically in dependence on a received objective setting, in particular in dependence on a focus setting, on a focal length setting, or on another objective setting that can comprise information on the instantaneous field of view of the objective or can be derived from such information. Provision can be made in this respect that it is possible to deviate manually from the automatic sensing of the distance sensor; for example, to restrict the measurement of the distances of a plurality of scene points to a special region of interest within the field of view of the objective or to extend the measurement of the distances to zones outside the field of view of the objective.

Examples for touch inputs for setting the distance sensor are, for instance, the dragging apart and together of two fingers in a horizontal or vertical direction on a touch-sensitive screen that produces an increase or decrease in the field of view of the distance sensor in a horizontal or vertical direction. The field of view of the distance sensor can furthermore, for example, be displaceable or pivotable in a horizontal or vertical direction by swiping two fingers in a horizontal or vertical direction on a touch-sensitive screen.

In accordance with an advantageous embodiment, the focus setting system furthermore comprises an objective drive apparatus that is configured to receive control signals output at a control signal output of the focus setting display unit and to adjust the focal distance of the objective in dependence on the received control signals. The objective drive apparatus is preferably configured to be attached to the objective of the moving image camera. The objective drive apparatus can, for example, have one or more motor-driven drive wheels that each roll off at a setting ring of the objective to adjust the focal distance of the objective and optionally further settings, in particular an f-number and/or a focal length (zoom) of the objective.

The method in accordance with the invention of simplifying the focusing of a moving image camera comprises the following steps: detecting a focus setting that represents an instantaneous focal distance of an objective of the moving image camera; measuring the distances of a plurality of scene points in the field of view of the objective from the moving image camera by means of a distance sensor; determining a frequency distribution of distance values that represent the measured distances; and displaying a graphical representation of the focus setting as well as a graphical representation of the frequency distribution of the distance values on a display device in a spatial relationship to one another that reflects the spatial relationship of the instantaneous focal distance of the objective to the distances of the plurality of scene points.

If the spatial relationship between the distance sensor and the moving image camera is not known in advance, these steps can furthermore be preceded by a calibration of the distance sensor by which the distance of a reference point or of a reference plane of the distance sensor from the reference plane, in particular from the image plane, of the moving image camera or of the objective is determined to be able to convert distances of the scene points measured by the distance sensor relative to its reference point or to its reference plane into distances of the scene points from the moving image camera.

Embodiments of the method can here additionally each have one or more steps that were described above in connection with embodiments of the focus setting display unit and of the focus setting system, in particular those steps for whose performance an element of a respective embodiment of the focus setting display unit or of the focus setting system is specifically configured. The advantages of the respective method result in a corresponding manner as for an embodiment of the focus setting display unit or of the focus setting system that can be used for performing this method. The focusing is in particular simplified by the method in accordance with the invention in that the spatial relationship of the instantaneous focal distance to the measured distances of the plurality of scene points and thus to the objects of the scene can be detected intuitively and comfortably with reference to the spatial relationship of the representations on the display device so that the person responsible for the focusing continuously receives direct and reliable visual feedback on the instantaneous focusing.

Said method can be performed in a particularly simple manner, in particular also on an external display device, for example on a separate display, in that the display device is controlled to carry out the method or the steps thereof.

The method in accordance with the invention of focusing a moving image camera comprises the steps of the above-named method of simplifying the focusing of a moving image camera and furthermore the following steps: identifying a characteristic zone of the frequency distribution as representative for an object to be focused; and adjusting the focal distance of the objective until the graphical representation of the focus setting and the graphical representation of the frequency distribution of the distance values are displayed on the display device in a spatial relationship to one another that corresponds to a focusing of the characteristic zone. The specific adjustment of the focal distance is not only simplified by this expanded method, but is advantageously also carried out immediately. The adjustment of the focal distance can take place manually, partly automatically, or also completely automatically here.

The invention will be described in the following by way of example with reference to the Figures.

Figure 1:
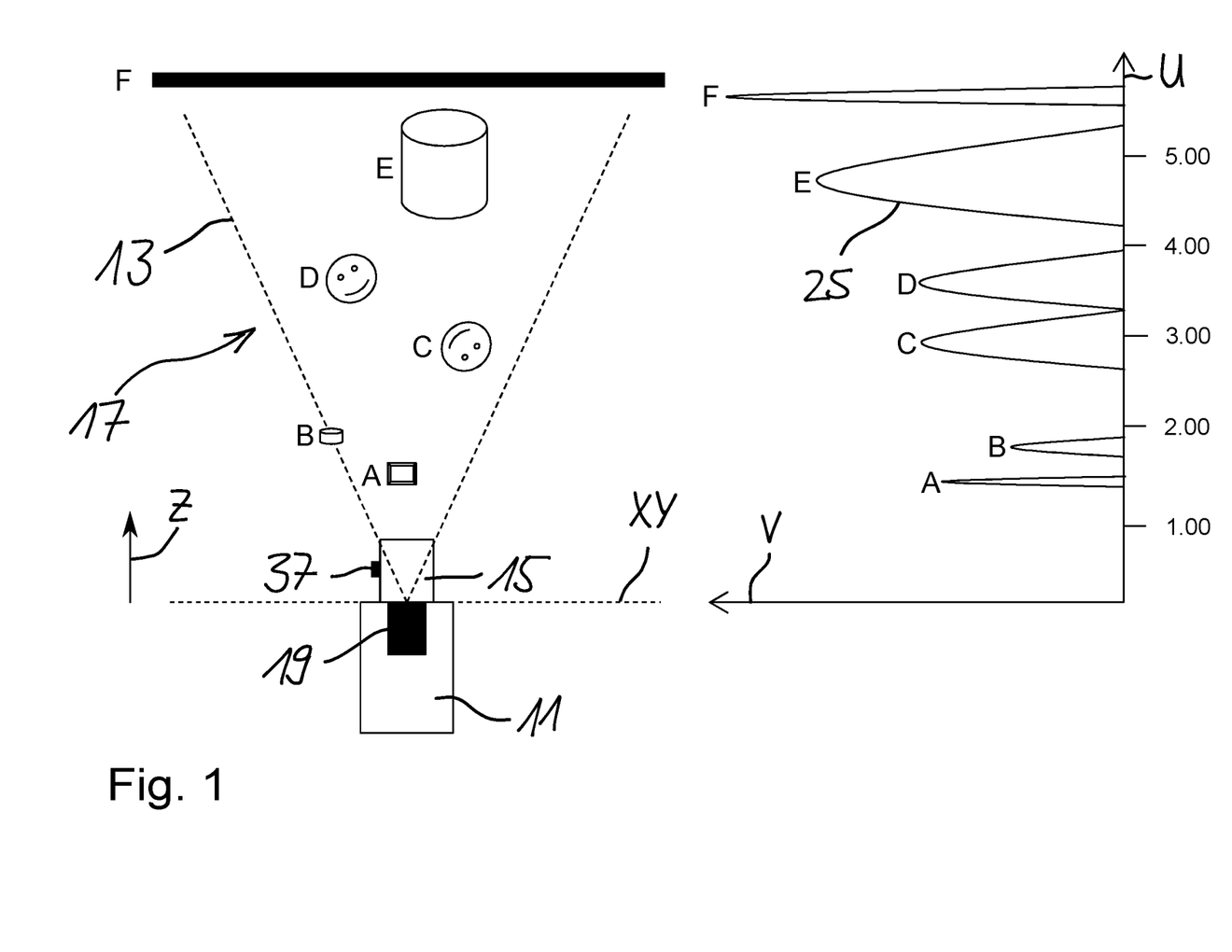
FIG. 1 shows in an exemplary schematic representation a scene to be recorded by means of a moving image camera in a view from above as well as a frequency distribution of distance values corresponding to the scene in accordance with an embodiment of the invention.

At the left hand side of FIG. 1, there are schematically shown in a view from above a moving image camera 11 (also referred to as a motion picture camera; e.g. electronic video camera or conventional camera) as well as a plurality of objects A-F of an exemplary scene 17 present in the field of view 13 of an objective 15 of the moving image camera 11 (also referred to as a lens assembly). The different objects A-F have different shapes and spatial extents and are arranged at different distances from the moving image camera 11.

A distance sensor 19 is fastened to the moving image camera 11 and is set such that its field of view 13 at least largely coincides with that of the objective 15, in particular apart from a parallax that results from the vertical offset of the distance sensor 19 from the objective 15. The distances of a plurality of scene points that are regularly distributed over the field of view 13 are detected by means of the distance sensor 19. If one of the objects A-F is present in the direction of view corresponding to a respective scene point, the scene point is disposed on the surface of this object A-F so that the distance of the object A-F is measured. In the exemplary scene 17 shown, each scene point is present on one of the objects A-F due to the extensive flat object F in the background of the scene 17. In general, no object A-F could, however, also be present within the range of the distance sensor 19, at least in a part of the field of view 13, which has the consequence that a maximum distance or an infinite distance is associated with the corresponding scene point.

The distance sensor 19 generally measures the distances of the scene points relative to itself. Due to the defined spatial arrangement of the distance sensor 19 relative to the moving image camera 11, these distances can, however, also be converted into distances from the moving image camera 11. The distances are here related to a reference plane XY that is in particular defined by the film plane or the sensor plane of the moving image camera 11 (image plane of the objective 15) or by the main plane of the objective 15. The distances are consequently related to the spatial direction Z that is aligned perpendicular to the reference plane XY and is called the depth as a rule. The distances typically measured radially from the distance sensor 19 by the distance sensor 19 are each either used directly since they at least approximately correspond to distances measured along the spatial direction Z or are converted into such distances.

Figure 2:
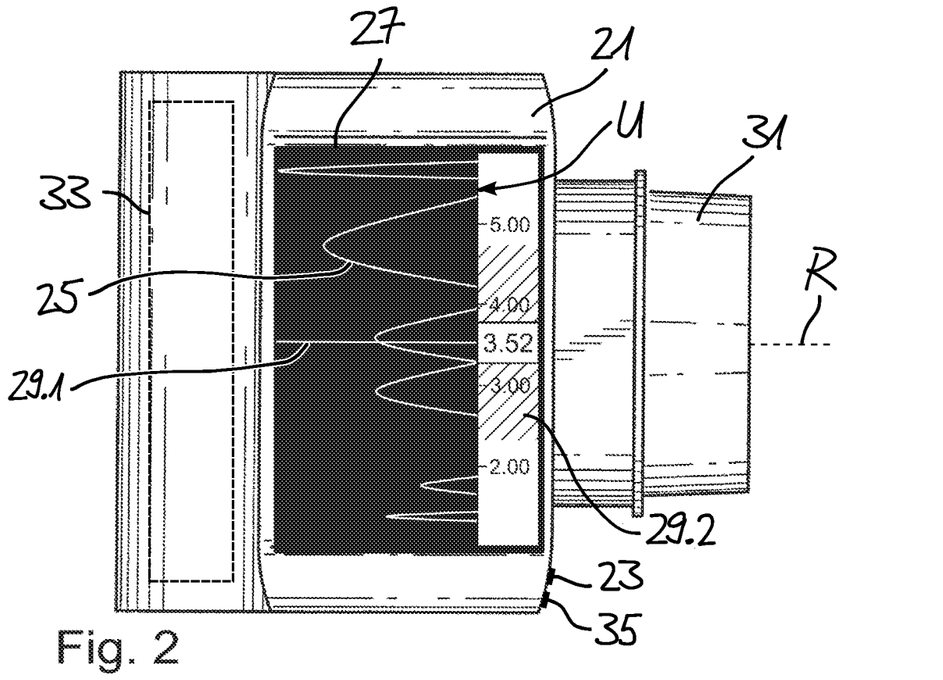
FIGS. 2 and 3 show schematic representations of an embodiment of the focus setting display unit in accordance with the invention whose display device displays graphical representations of the focus setting and of the frequency distribution of the distance values in different spatial relationships to one another.

The distances are received in the form of distance values that can also comprise further information on the respective scene point, e.g. on its spatial angle relative to the distance sensor 19 or to the moving image camera 11, from a focus setting display unit 21 via a data input 23 (cf. e.g. FIG. 2). The focus setting display unit 21 furthermore also receives the focus setting of the objective 15 that represents an instantaneous focal distance of the objective 15 via the data input 23. The focal distance of the objective 15 is here preferably defied in a corresponding manner as said distances of the scene point, i.e. with respect to the spatial direction Z having the reference plane XY as the zero point. The instantaneous focal distance of the objective 15 and the measured distances of the scene points can thereby be set directly into relation.

The right hand side of FIG. 1 shows a graphical representation of a frequency distribution 25 of the distance values received by the focus setting display unit 21. The vertical axis U in FIG. 1 corresponds to the depth Z in this respect. The frequency distribution 25 is entered as a curve over this axis U as the abscissa, with the ordinate V indicating the frequency, that is the (optionally averaged) number of the distances measured corresponding to a certain depth Z. The depth Z is here divided into a row of consecutive distance zones for the determination of the frequency. The indicated scaling of the axis U is linear in the example shown; the measurement unit of the numerical values is meters, for example. The ordinate V can have an arbitrary unit and can, for example, be scaled linearly or logarithmically.

The frequency distribution 25 has a plurality of peaks that result due to the cluster of distance values that represent a distance from the moving image camera 11 in which one of the objects A-F is present. The surface of a peak here depends on the size of the surface of the respective object A-F visible from the moving image camera 11 or from the distance sensor 19. In this respect, the width of a peak is a sign for a variance of the distances measured at a respective object A-F and thus for objects A-F whose surfaces differ more or less from an alignment in parallel with the reference plane XY.

Figure 7:
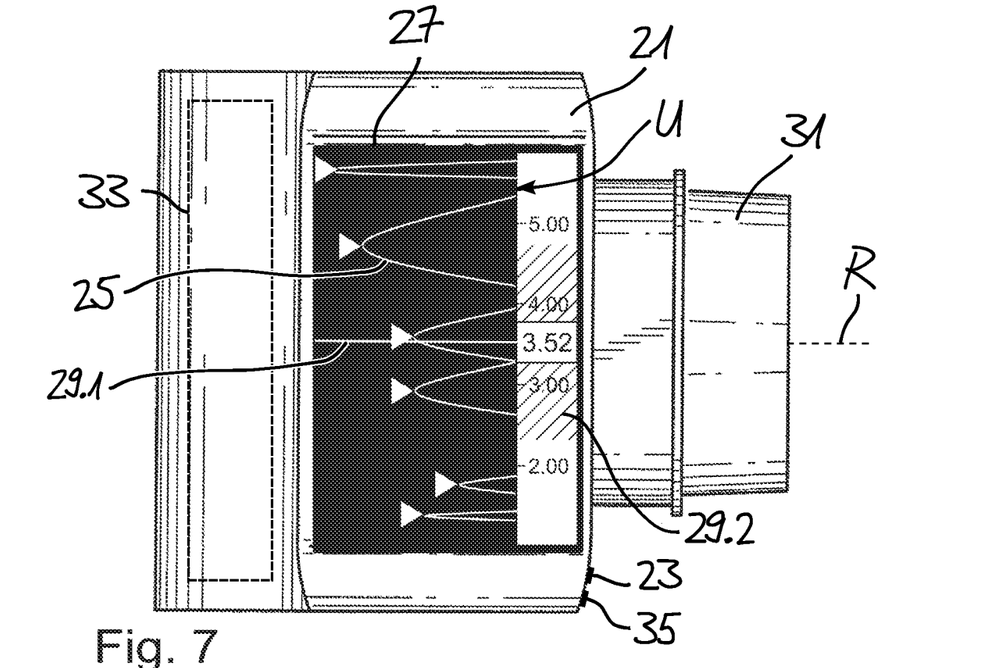

The peaks of the frequency distribution 25 can in particular be associated with the different objects A-F with reference to their position along the axis U, but additionally also with reference to their area and width, and are therefore marked in a corresponding manner by A to F in FIG. 1. Such a marking can also be part of the graphical representation of the frequency distribution 25. An alternative kind of marking by markers is shown in FIG. 7.

A respective focus setting display unit 21 having a display device 27 is shown in FIGS. 2, 3, 6, 7, and 8 that displays a graphical representation of the focus setting 29 of the objective 15 as well as a graphical representation of the frequency distribution 25 in a spatial relationship to one another that reflects the spatial relationship of the instantaneous focal distance of the objective 15 to the distances of the plurality of scene points on which the distance values underlying the frequency distribution are based. The focus setting display unit 21 shown in these Figures can here each be the same embodiment, with this focus setting display unit 21 being configured to represent the frequency distribution 25 and the focus setting 29 of the objective 15 depending on the specification by a user in one of the manners shown in the Figures. The focus setting display units 21 shown in said Figures can, however, also be respectively different embodiments.

The graphical representation of the focus setting 29 comprises a line 29.1 and a zone 29.2 that is shown hatched in the black and white representation of the Figures and that could also be shown as a colored background, for example. The line 29.1 can equally be colored, in particular with a color differing from the color of the graphical representation of the frequency distribution 25. The focus setting 29 of the objective 15 and the frequency distribution 25 are show entered over a common axis U that corresponds to the axis U shown in FIG. 1. The line 29.1 is here at the axis U at that position that corresponds to the instantaneous focal distance of the objective 15. In addition to the representation as a line 29.1, the instantaneous focal distance is additionally displayed as a numerical value emphasized by a frame in the region of the scale of the axis U. The distance zone that corresponds to the instantaneous focal range of the objective 15 is marked by the zone 29.2. The graphical representation of the frequency distribution 25 can also be superposed by the graphical representation of the focus setting 29, in particular of the instantaneous focal range 29.9. Since the graphical representation of the focus setting 29 of the objective 15 and the graphical representation of the frequency distribution 25 are displayed in a specific spatial relationship to one another, namely with reference to this same common axis U, the spatial relationship of the instantaneous focal distance and of the instantaneous focal range of the objective 15 to the objects A-F appearing as peaks in the frequency distribution 25 can be read off fast and intuitively on the focus setting display unit 21.

The focus setting display units 21 shown in FIGS. 2, 3, 6, and 8 each also have an operating element 31 in the form of a control knob that is rotatable about an axis of rotation R in addition to the display device 27. Depending on an actuation of the operating element 31, a control signal is generated by an evaluation and control device 33 of the focus setting display unit 21 arranged in the interior of the focus setting display unit 21 and shown only schematically in the Figures and is output at a control signal output 35 of the focus setting display unit 21 to an objective drive apparatus 37 arranged at the objective 15 (cf. FIG. 1) to adjust the focal distance of the objective 15. To this extent, the focus setting display units 21 shown are focus setting display and control units or simply focus setting units.

The adjustment of the focal distance has the result that the graphical representation of the focus setting 29 with respect to the graphical representation of the frequency distribution 25 along the common axis U. As can be recognized in comparison with FIGS. 2 and 3, the graphical representation of the focus setting 29 here does not change its position in the display surface of the display device 27, but the axis U and with it the graphical representation of the frequency distribution 25 is rather displaced; in addition, the displayed numerical value of the instantaneous focal distance is adapted to the change.

Figure 3:
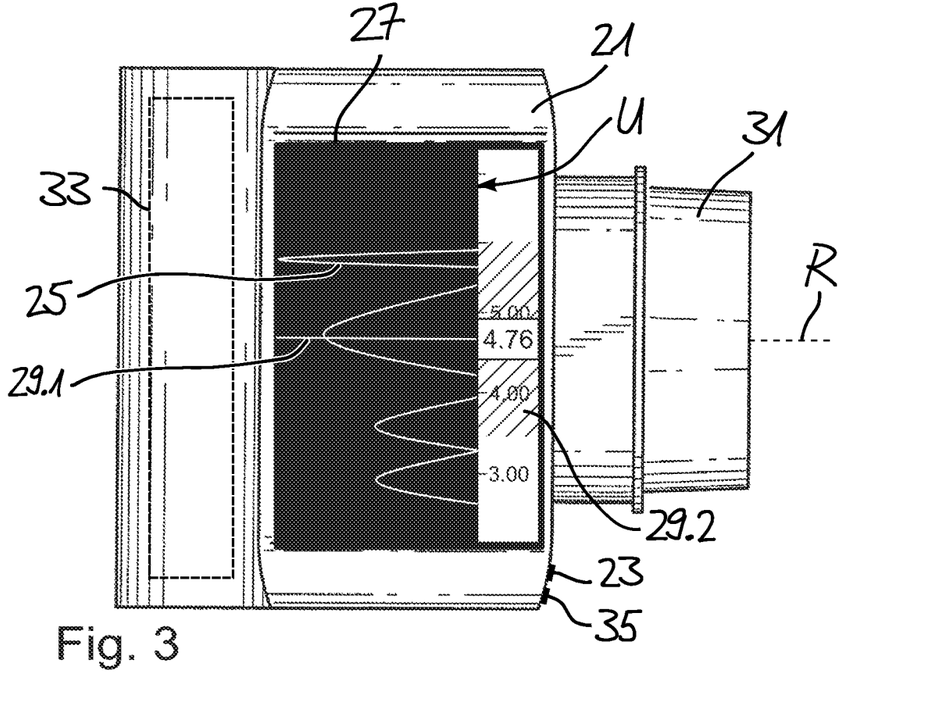

Since the spatial relationship of the graphical representation of the focus setting 29 of the objective 15 relative to the graphical representation of the frequency distribution 25 changes in a corresponding manner on the focusing, that is on an adjustment of the focal distance of the objective 15, the person responsible for the focusing receives direct feedback on which objects A-F are instantaneously present in the focus of the objective 15 by looking at the focus setting display unit 21. The line 29.1 representing the focal distance can in particular be at least substantially brought into agreement with the peak of the frequency distribution 25 for the focusing of a respective object A-F, as is shown in FIGS. 2 and 3 for respectively different peaks or objects A-F. At the same time, which further objects A-F are at least still disposed in the focal range of the objective 15 can be read off with reference to the zone 29.2. In this manner, a reliable focusing of one or more respective objects A-F can be supported and substantially simplified.

Figure 4:
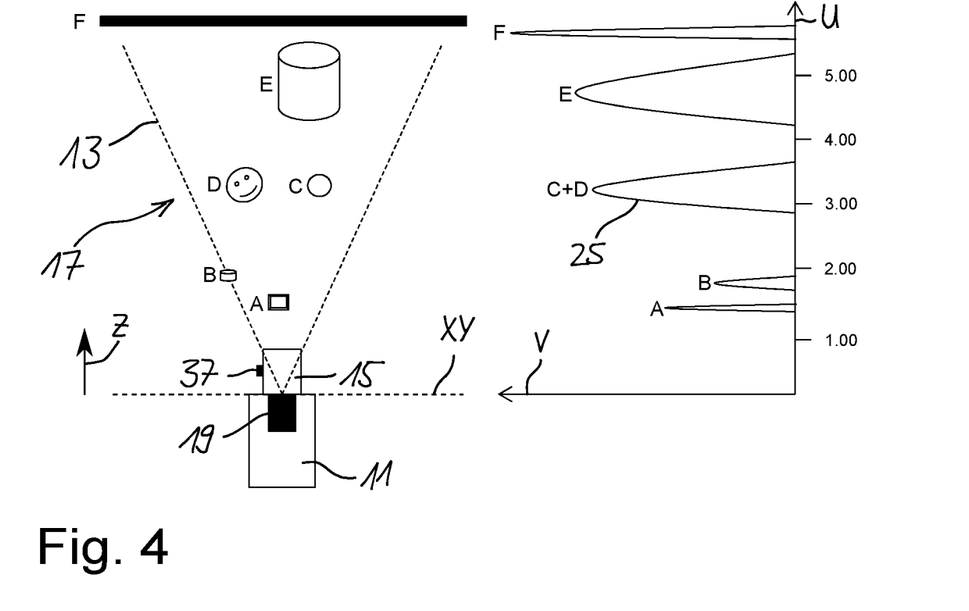
FIGS. 4 and 5 show representations corresponding to FIG. 1 and illustrate different possibilities of a graphical representation of the frequency distribution when two objects of the scene are present at the same distance from the moving image camera.
Figure 5:
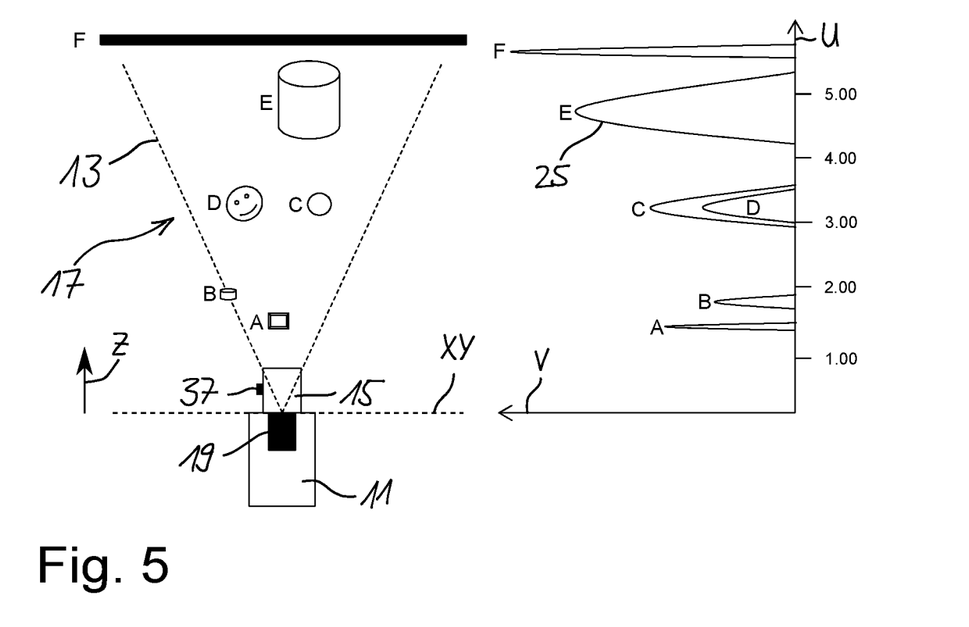

FIGS. 4 and 5 show two alternative kinds of determining or graphically representing the frequency distribution 25 whose difference is in particular relevant when two or more objects C, D are arranged at the same distance from the moving image camera 11. If the frequency distribution is a uniform frequency distribution for which a distinction is not made between distances originating from different portions of the field of view 13, the frequency distribution 25 shown in FIG. 4 results for the arrangement of objects A-F shown in FIGS. 4 and 5. A single peak (marked as C+D) therein then corresponds to the plurality of objects C D and therefore has a correspondingly increased height.

If the distance sensor 19 is configured to measure not only the distance for each scene point, but also to determine in which of a plurality of portions into which the field of view 13 of the objective 15 or of the distance sensor 19 is divided the scene point is disposed, a frequency distribution specific to the image field portion can alternatively be determined. In the embodiment in accordance with FIG. 5, the field of view 13 is divided for this purpose into a plurality of vertical strips each having the same horizontal angular extent. The objects C and D are then disposed in different ones of these portions of the field of view 13 for which the frequencies of the distance values are determined respectively separately. As shown in FIG. 5, the graphical representation of such a frequency distribution 25 specific to a field of view portion can comprise a plurality of curves that correspond to different portions of the field of view 13 and can therefore also mutually overlap. In this manner, different objects C, D arranged at the same distance from the moving image camera 11, but in different portions of the field of view 13, can be distinguished in the graphical representation of the frequency distribution 25.

Figure 6:
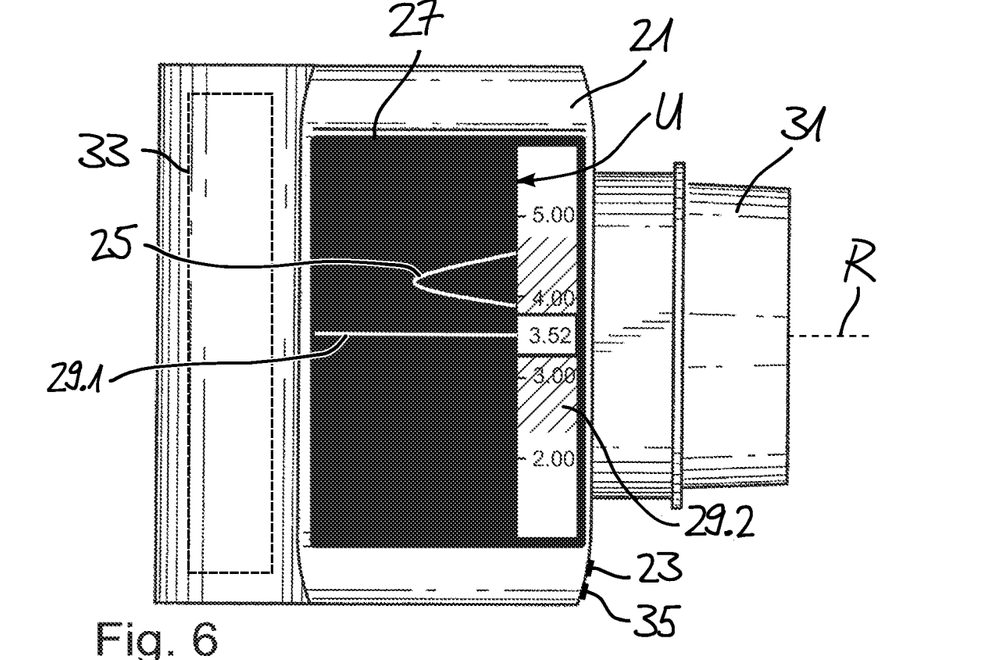
FIGS. 6, 7, and 8 show representations corresponding to FIGS. 2 and 3 and illustrate supplementary possibilities of displaying the graphical representations of the focus setting and of the frequency distribution of the distance values.

A graphical representation of a frequency distribution 25 of distance values is displayed in the focus setting display unit 21 shown in FIG. 6 and is restricted to an adaptive distance zone that is defined by the position and extent of the displayed peak of the frequency distribution 25. The frequency distribution 25 actually extends over a larger zone than only the width of this peak and has further peaks. However, the remaining parts of the frequency distribution 25 are masked to specifically emphasize the displayed peak and thus the object A-F underlying this peak. If the peak is displaced within the frequency distribution 25 due to a movement of the underlying object A-F, the distance zone that is adaptive in this respect and within which the graphical representation of the frequency distribution 25 is imaged also changes in a corresponding manner.

FIG. 7 largely corresponds to FIG. 2, with the maximum values of peaks of the frequency distribution 25 each being specifically marked by a marker that, for example, has a triangular shape. The markers can differ from one another, e.g. with respect to their color and/or shape for a specific association with a peak or with the underlying object A-F of the scene 17. On changes of the frequency distribution 25 as a result of movements of the objects A-F, the markers are tracked in a corresponding manner and thereby in particular simplify the association of the peaks with the objects A-F in complex scenarios.

Figure 8:
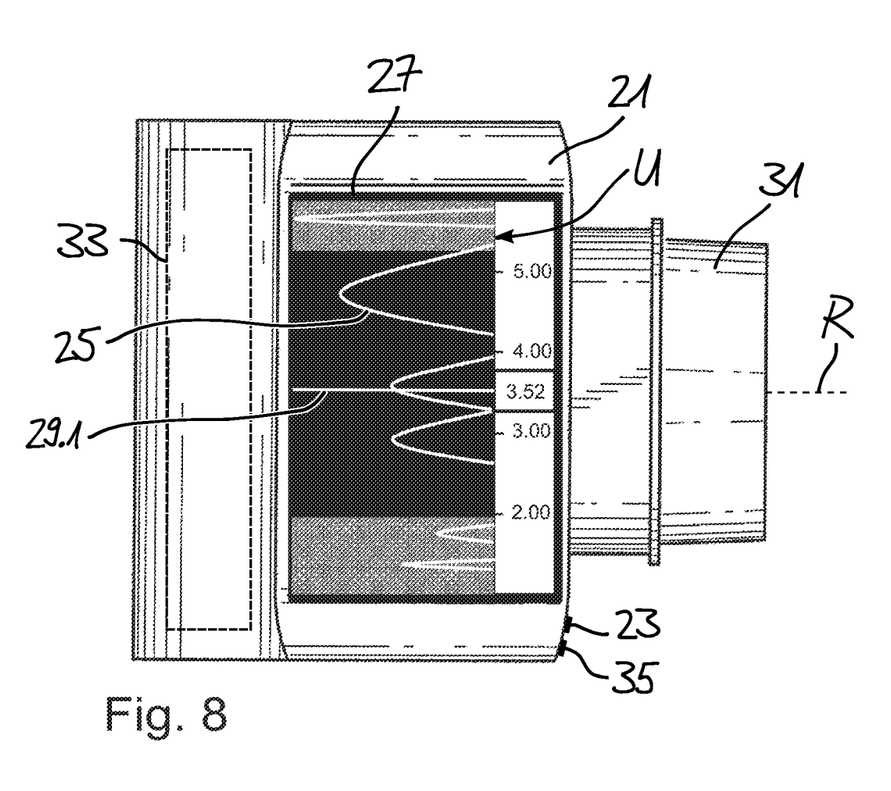

In FIG. 8 the graphical representation of a frequency distribution 25 is displayed without impairment in a similar manner to in FIG. 6 only over a certain distance zone. In two marginal zones of the axis U, the frequency distribution 25 is in contrast admittedly not completely masked, but is shown weakened by a superposition. The distance zone in which the frequency distribution 25 is shown unimpaired in this respect corresponds to a zone predefined by a user to which the adjustment of the focus setting of the objective 15 is restricted (at least by means of the focus setting display unit 21).

Figure 9:
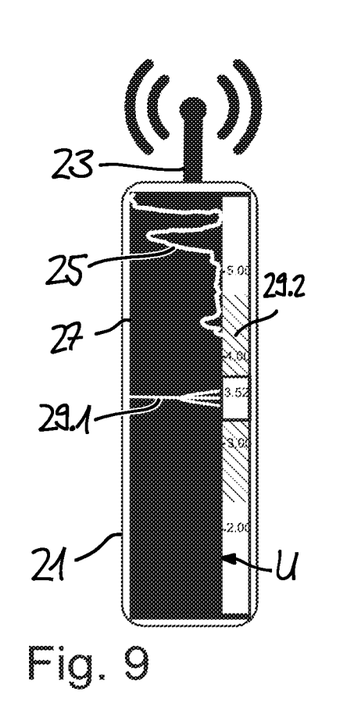
FIG. 9 shows in a schematic representation a further embodiment of a focus setting display unit in accordance with the invention.

An embodiment of a focus setting display unit 21 substantially differing from the focus setting display units 21 shown in the other Figures is shown in FIG. 9. This embodiment does not have any control knob or any other mechanical operating element for adjusting the focus setting of the objective 15, but is rather restricted to simplifying the focusing by displaying the graphical representation of the focus setting 29 of the objective 15 in said spatial relationship for the graphical representation of the frequency distribution 25 of the distance values. The focus setting display unit 21 can therefore be formed in a comparatively compact manner and can, for instance, be used as an accessory to a focusing apparatus or to a monitor for displaying the detected moving image. The focus setting display unit 21 can here be configured especially for a fastening at a focusing apparatus, at a monitor, and/or at a moving image camera 11. The reception of the focus setting and of the distance values takes place on a radio basis in this focus setting display unit 21 by means of an antenna that represents the data input 23 of the focus setting display unit 21. The focus setting display units 21 shown in the other Figures can also generally have one or more such antennas as a data input 23 and/or as a control signal output 35.

REFERENCE NUMERALS 11 moving image camera
13 field of view
15 objective
17 scene
19 distance sensor
21 focus setting display unit
23 data input
25 graphical representation of the frequency distribution
27 display device
29 graphical representation of the focus setting
29.1: line; 29.2: zone
31 operating element
33 evaluation and control device
35 control signal output
37 objective drive apparatus
R axis of rotation
U common axis
V ordinate
XY reference plane
Z depth

The invention claimed is:

1. A focus setting display unit (21) for a moving image camera (11), comprising
a data input (23) for receiving a focus setting that represents an instantaneous focal distance of an objective (15) of the moving image camera (11) and for receiving distance values that represent the distances of a plurality of scene points in a field of view (13) of the objective (15) from the moving image camera (11);
a display device (27) configured to display a graphical representation of the focus setting (29) and a graphical representation of a frequency distribution of the distance values in a spatial relationship to one another that reflects the spatial relationship of the instantaneous focal distance of the objective (15) to the distances of the plurality of scene points.

2. The focus setting display unit in accordance with claim 1, wherein the display device (27) is configured to depict the focus setting and the frequency distribution (25) arranged along a common axis (U) for the display of the graphical representation of the focus setting (20) and of the graphical representation of the frequency distribution (25) of the distance values.

3. The focus setting display unit in accordance with claim 1, wherein the frequency distribution (25) of the distance values is a uniform frequency distribution in that each distance zone of a series of consecutive distance zones has the number of all of the distance values falling in this distance zone associated with it as a frequency.

4. The focus setting display unit in accordance with claim 1, wherein the frequency distribution (25) of the distance values is a frequency distribution specific to a field of view portion in that the field of view (13) of the objective (15) is divided into portions and the number of those distance values falling in this distance zone is associated as a frequency with each combination of one of the portions with a distance zone of a series of consecutive distance zones, said distance values representing the distance of a scene point disposed in the respective portion from the moving image camera (11).

5. The focus setting display unit in accordance with claim 1, wherein the display device (27) is configured to display a graphical representation of the frequency distribution (25) of the distance values that is restricted to at least one of: a predefinable distance zone and an adaptive distance zone.

6. The focus setting display unit in accordance with claim 5,
wherein the adaptive distance zone corresponds to the zone of a peak of the frequency distribution (25) that of all the peaks of the frequency distribution (25) corresponds to the smallest distance from the moving image camera (11).

7. The focus setting display unit in accordance with claim 1, wherein the display device (27) is configured to display a graphical representation of the frequency distribution (25) of the distance values that comprises a separate marking of maxima of the frequency distribution (25) by means of graphical markers.

8. The focus setting display unit in accordance with claim 1, further comprising:
a control signal output (35) for outputting control signals to adjust the focal distance of the objective (15).

9. The focus setting display unit in accordance with claim 8, further comprising:
an operating element (31),
wherein control signals are output to adjust the focal distance of the objective (15) at the control signal output (35) in dependence on actuations of the operating element (33).

10. The focus setting display unit in accordance with claim 8, wherein control signals are output to adjust the focal distance of the objective (15) at the control signal output (35) in dependence on changes of the frequency distribution (25) of the distance values.

11. The focus setting display unit in accordance with claim 10, wherein the control signals are output such that the focal distance of the objective (15) is regulated in accordance with a desired value for the focal distance defined by a characteristic zone of the frequency distribution (25).

12. The focus setting display unit in accordance with claim 1,
wherein the display device (27) comprises a touch-sensitive screen that is configured to display the graphical representation of the focus setting (29) and the graphical representation of the frequency distribution (25) of the distance values and to detect touch inputs.

13. A focus setting system for a moving image camera, comprising
a focus setting display unit (21) comprising:
a data input (23) for receiving a focus setting that represents an instantaneous focal distance of an objective (15) of the moving image camera (11) and for receiving distance values that represent the distances of a plurality of scene points in a field of view (13) of the objective (15) from the moving image camera (11);
a display device (27) configured to display a graphical representation of the focus setting (29) and a graphical representation of a frequency distribution of the distance values in a spatial relationship to one another that reflects the spatial relationship of the instantaneous focal distance of the objective (15) to the distances of the plurality of scene points; and
a distance sensor (19) for measuring the distances of the plurality of scene points from the moving image camera (11) and for outputting distance values that represent the measured distances to the data input (23) of the focus setting display unit (21).

14. The focus setting system in accordance with claim 13, further comprising:
an objective drive apparatus (37) that is configured to receive control signals output at a control signal output (35) of the focus setting display unit (21) and to adjust the focal distance of the objective (15) in dependence on the received control signals.

15. A method of simplifying the focusing of a moving image camera (11), said method comprising the following steps:
detecting a focus setting that represents an instantaneous focal distance of an objective (15) of the moving image camera (11);
measuring the distances of a plurality of scene points in a field of view (13) of the objective (15) from the moving image camera (11) by means of a distance sensor (19);
determining a frequency distribution of distance values that represent the measured distances; and
displaying a graphical representation of the focus setting (29) and a graphical representation of the frequency distribution (25) of the distance values on a display device (27) in a spatial relationship to one another that reflects the spatial relationship of the instantaneous focal distance of the objective (15) to the distances of the plurality of scene points.

16. The method in accordance with claim 15, additionally comprising the following steps:
identifying a characteristic zone of the frequency distribution (25) as representative for an object (A-F) to be focused;
and adjusting the focal distance of the objective (15) until the graphical representation of the focus setting (29) and the graphical representation of the frequency distribution (25) of the distance values on the display device (27) are displayed in a spatial relationship to one another that corresponds to a focusing of the characteristic zone.

17. The method in accordance with claim 15,
wherein the step of displaying the graphical representation of the focus setting (25) and the graphical representation of the frequency distribution (25) of the distance values on the display device (27) comprises depicting the focus setting (29) and the frequency distribution (25) arranged along a common axis (U).

\* \* \* \* \*